(12) United States Patent
Subramanya et al.

(10) Patent No.: US 12,500,819 B2
(45) Date of Patent: Dec. 16, 2025

(54) FRAMEWORK FOR TRUSTWORTHINESS

(71) Applicant: Nokia Technologies Oy, Espoo (FI)

(72) Inventors: Tejas Subramanya, Munich (DE); Janne Ali-Tolppa, Espoo (FI); Henning Sanneck, Munich (DE); Laurent Ciavaglia, Massy (FR)

(73) Assignee: Nokia Technologies Oy, Espoo (FI)

( * ) Notice: Subject to any disclaimer, the term of this patent is extended or adjusted under 35 U.S.C. 154(b) by 130 days.

(21) Appl. No.: 18/555,117

(22) PCT Filed: May 11, 2021

(86) PCT No.: PCT/EP2021/062396
§ 371 (c)(1),
(2) Date: Oct. 12, 2023

(87) PCT Pub. No.: WO2022/237963
PCT Pub. Date: Nov. 17, 2022

(65) Prior Publication Data
US 2024/0195701 A1     Jun. 13, 2024

(51) Int. Cl.
*H04L 41/14* (2022.01)
*H04L 41/16* (2022.01)
*H04L 41/5003* (2022.01)

(52) U.S. Cl.
CPC .......... *H04L 41/145* (2013.01); *H04L 41/16* (2013.01); *H04L 41/5003* (2013.01)

(58) Field of Classification Search
CPC ... H04L 41/145; H04L 41/16; H04L 41/5003; H04L 43/16; H04L 43/00
See application file for complete search history.

(56) References Cited

U.S. PATENT DOCUMENTS

| 2017/0235848 | A1* | 8/2017 | Van Dusen | .......... G06Q 10/101 |
| | | | | 705/12 |
| 2019/0171438 | A1* | 6/2019 | Franchitti | ................ G06N 3/08 |
| 2020/0193313 | A1 | 6/2020 | Ghanta et al. | |

FOREIGN PATENT DOCUMENTS

WO     2021/069196 A1     4/2021

OTHER PUBLICATIONS

"What is a Container?", Docker, Retrieved on Oct. 6, 2023, Webpage available at : https://www.docker.com/resources/what-container/.
"What is Kubeflow?", Kubeflow, Retrieved on Oct. 6, 2023, Webpage available at : https://www.kubeflow.org/.
"Ethics Guidelines for Trustworthy AI", European Commission, Apr. 8, 2019, 41 pages.
"Information technology—Artificial intelligence—Overview of trustworthiness in artificial intelligence", ISO/IEC TR 24028, First edition, May 2020, 50 pages.

(Continued)

*Primary Examiner* — Brian J. Gillis
(74) *Attorney, Agent, or Firm* — Barta Jones, PLLC

(57) ABSTRACT

Method comprising: receiving a trust level requirement for a service; translating the trust level requirement into a requirement for at least one of a fairness, an explainability, and a robustness of a calculation performed by an artificial intelligence pipeline related to the service; providing the requirement for the at least one of the fairness, the explainability, and the robustness to a trust manager of the artificial intelligence pipeline.

16 Claims, 9 Drawing Sheets

(56) References Cited

OTHER PUBLICATIONS

"Adversarial Robustness Toolbox (ART) v1.16", github, Retrieved on Oct. 6, 2023, Webpage available at : https://github.com/Trusted-AI/adversarial-robustness-toolbox.
"Explainable A", Google Cloud, Retrieved on Oct. 6, 2023, Webpage available at : https://cloud.google.com/explainable-ai.
"Responsible AI Toolkit", TensorFlow, Retrieved on Oct. 6, 2023, Webpage available at : https://www.tensorflow.org/responsible_ai.
Camburu, "Explaining Deep Neural Networks", arXiv, Thesis, Oct. 4, 2020, 134 pages.
"Excellence and Trust in AI—Brochure", European Commission, Retrieved on Oct. 6, 2023, Webpage available at :https://digital-strategy.ec.europa.eu/en/library/excellence-and-trust-ai-brochure.
"Artificial intelligence: Why it is necessary to interpret AI—Knowledge", SZ.de, Retrieved on Oct. 6, 2023, Webpage available at :https://www.sueddeutsche.de/wissen/ki-machinelles-lernen-neuronale-netze-informatik-erklaerbarkeit-1.5109715.
Tsagkaris et al., "Unified Management Framework (UMF) Specifications", Univer Self, Deliverable D2.4, Release 3, 2013, pp. 1-157.
BåRøe et al., "How to achieve trustworthy artificial intelligence for health", Bulletin of the World Health Organization, vol. 98, No. 4, 2020, pp. 257-262.
"AI in the banking industry", European Banking Federation, Jul. 1, 2019, pp. 1-42.
"Msc-generator", Sourceforge, Retrieved on Oct. 6, 2023, Webpage available at : https://sourceforge.net/projects/msc-generator/.
"3rd Generation Partnership Project; Technical Specification Group Services and System Aspects; Policy and charging control architecture (Release 8)", 3GPP TS 23.203, V8.15.0, Dec. 2014, pp. 1-116.
"Zero-touch network and Service Management (ZSM); Reference Architecture", ETSI GS ZSM 002, V1.1.1, Aug. 2019, pp. 1-80.
International Search Report and Written Opinion received for corresponding Patent Cooperation Treaty Application No. PCT/EP2021/062396, dated Jan. 28, 2022, 13 pages.
Li et al., "Trustworthy Deep Learning in 6G Enabled Mass Autonomy: From Concept to Quality-of-Trust Key Performance Indicators", IEEE Vehicular Technology Magazine, vol. 15, No. 4, Dec. 2020, pp. 112-121.

* cited by examiner

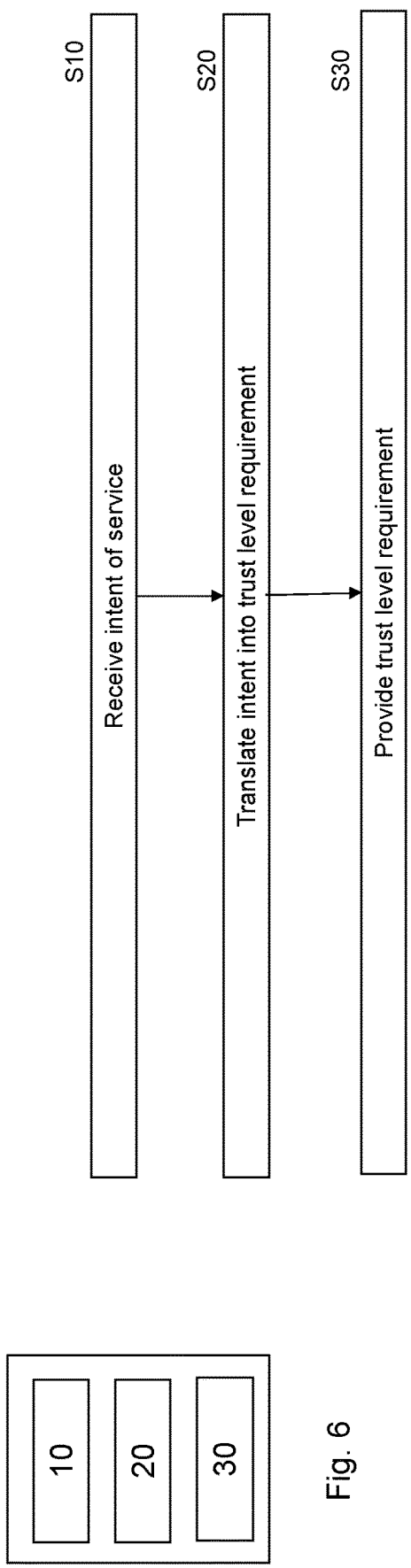

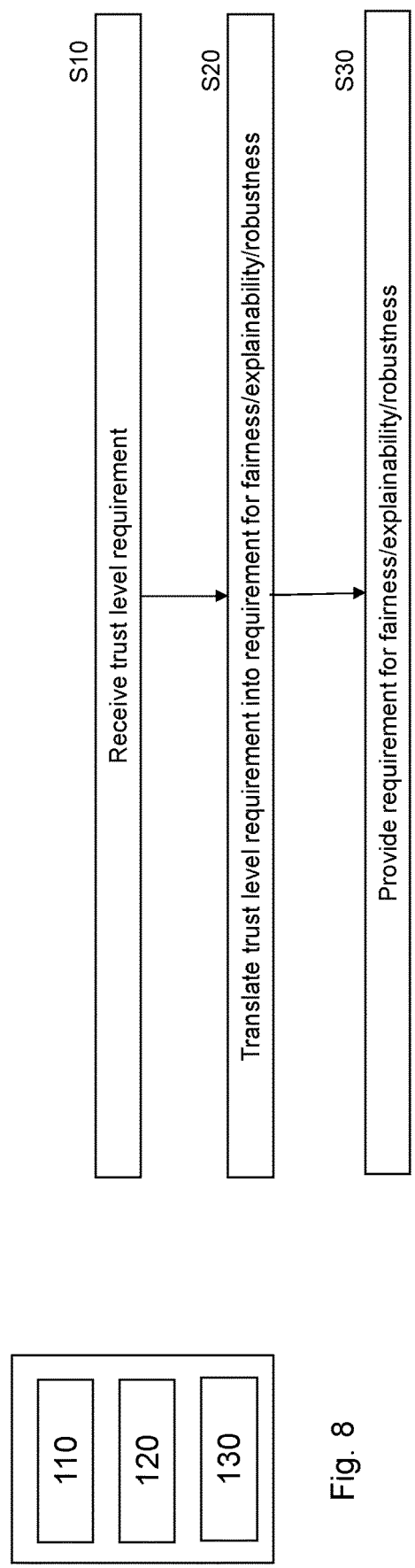

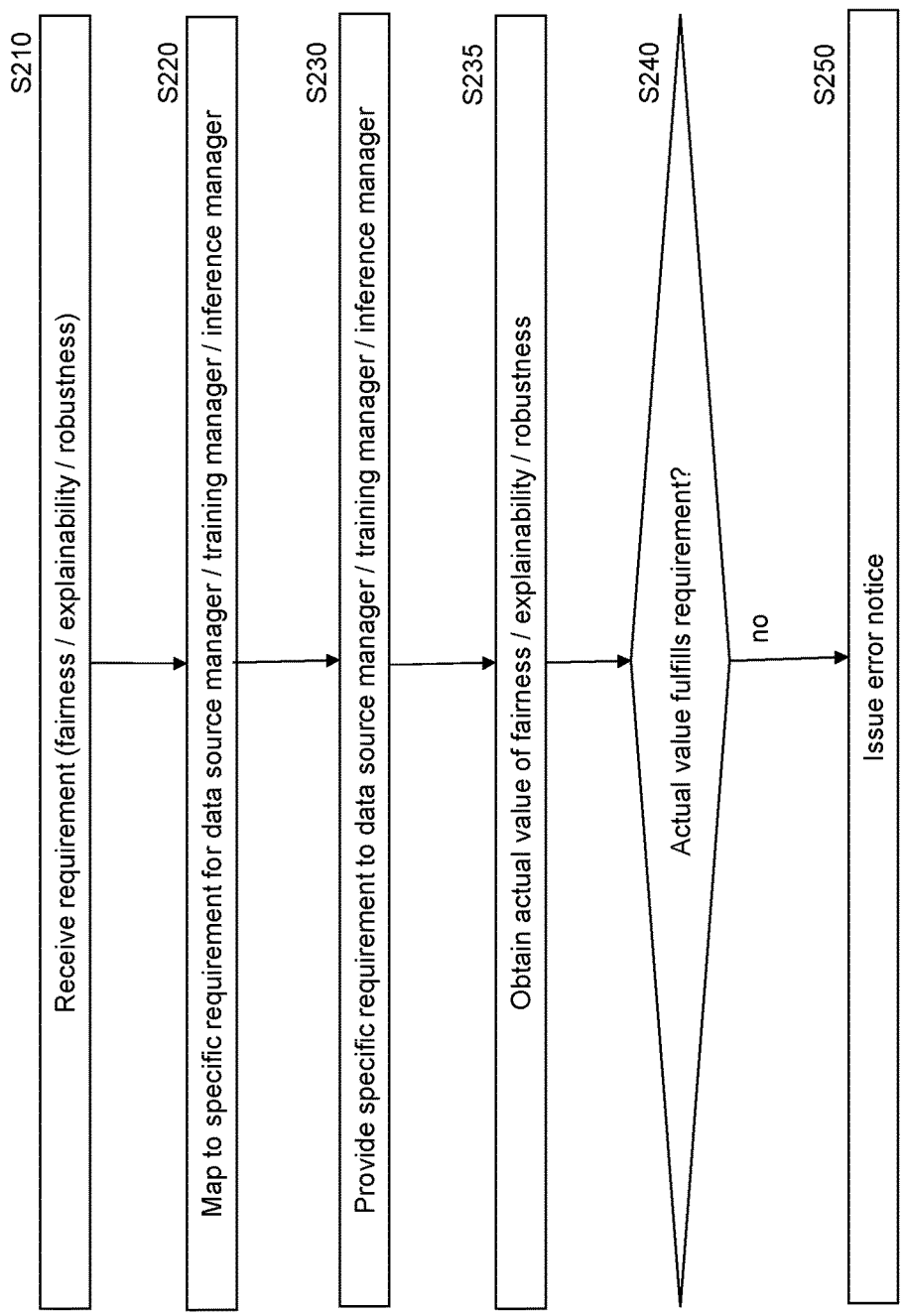
Fig. 11
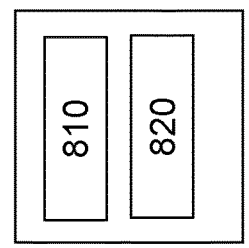
Fig. 10
Fig. 12

FRAMEWORK FOR TRUSTWORTHINESS

RELATED APPLICATION

This application claims priority to PCT Patent Application No. PCT/EP2021/062396, filed May 11, 2021, which is incorporated herein by reference in its entirety.

FIELD OF THE INVENTION

The present disclosure relates to trustworthiness. In particular, it may related to a framework for trustworthy artificial intelligence. It may be applied in particular to cognitive autonomous networks.

| Abbreviations | |
|---|---|
| 3GPP | $3^{rd}$ Generation Partnership Project |
| 4G/5G/6G | $4^{th}/5^{th}/6^{th}$ Generation |
| AI | Artificial Intelligence |
| API | Application Programmable Interface |
| AV | Autonomous Vehicle |
| CAN | Cognitive Autonomous Network |
| CNF | Cognitive Network Function |
| CPU | Central Processing Unit |
| ETSI | European Telecommunications Standards Institute |
| EU | European Union |
| GAN | Generative Adversarial Networks |
| HLEG | High Level Expert Group |
| ISO | International Standardization Organization |
| IEC | International Electrotechnical Commission |
| LIME | Local interpretable model-agnostic explanations |
| MANO | Management and Orchestration |
| ML | Machine Learning |
| QCI | QoS Class Identifier |
| QoE | Quality of Experience |
| QoS | Quality of Service |
| QoT | Quality of Trustworthiness |
| RAN | Radio Access Network |
| RRC | Radio Resource Control |
| SHAP | SHapley Additive explanations |
| TAI | Trustworthy Artificial Intelligence |
| TAIF | TAI Framework |
| TED | Teaching Explainable Decisions |
| TS | Technical Specification |
| UMF | Unified Management Framework |
| VAE | Variational Autoencoder |
| VNF | Virtual Network Function |
| ZSM | Zero-touch network and Service Management |

BACKGROUND

An Artificial Intelligence (AI) or Machine Learning (ML) Pipeline helps automate AI/ML workflows by splitting them into independent, reusable and modular components that can then be pipelined together to create a model. AI/ML Pipeline is typically not a one-way flow, i.e., it is iterative, and every step is repeated to continuously improve the accuracy of the model and achieve a successful algorithm. The AI/ML pipeline typically comprises at least the following three components (see FIG. 1):

Data Source Manager (e.g., data collection, data preparation),
Model Training Manager (e.g., hyperparameter tuning), and
Model Inference Manager (e.g., model evaluation).

With AI/ML pipelining and the recent push for microservices architecture (e.g., containers [1]), each AI/ML workflow component is abstracted into an independent service that relevant stakeholders (e.g., data engineers, data scientists) can independently work on. Besides, the AI/ML Pipeline Orchestrator (e.g., Kubeflow [2]) can manage the AI/ML Pipelines' lifecycle (e.g., commissioning, scaling, decommissioning), as represented in FIG. 1.

For AI/ML systems to be widely accepted, they should be trustworthy in addition to their performance (e.g., accuracy). The High-level Expert Group (HLEG) group on AI has developed the European Commission's Trustworthy AI (TAI) strategy. In the deliverable 'Ethics Guidelines for Trustworthy AI' released in April 2019, the group has listed seven critical requirements that the AI systems should meet to be considered trustworthy. Below are the requirements (extract from [3]):

1. Transparency: Include traceability, explainability and communication.
2. Diversity, non-discrimination and fairness: Include the avoidance of unfair bias, accessibility and universal design, and stakeholder participation.
3. Technical robustness and safety: Include resilience to attack and security, fall back plan and general safety, accuracy, reliability and reproducibility.
4. Privacy and data governance: Include respect for privacy, quality and integrity of data, and access to data.
5. Accountability: Include auditability, minimization and reporting of negative impact, trade-offs and redress.
6. Human agency and oversight: Include fundamental rights, human agency and human oversight.
7. Societal and environmental wellbeing: Include sustainability and environmental friendliness, social impact, society and democracy.

Additionally, ISO/IEC has also published a technical report on 'Overview of trustworthiness in artificial intelligence' [4]. Early efforts in the open-source community are also visible towards developing TAI frameworks/tools/libraries such as IBM AI360 [5][6][7], Google Explainable AI [8] and TensorFlow Responsible AI [9]. Below are introduced some key TAI definitions/algorithms/metrics described in the AI/ML research community [3]-[9] that will help to understand the explanation of the invention.

1. Fairness: Fairness is the process of understanding bias introduced in the data, and ensuring the model provides equitable predictions across all demographic groups. It is important to apply fairness analysis throughout the entire AI/ML Pipeline, making sure to continuously reevaluate the models from the perspective of fairness and inclusion. This is especially important when AI/ML is deployed in critical business processes that affect a wide range of end users. There are three broad approaches to detect bias in the AI/ML model:
    a. Pre-processing fairness—To detect bias in the AI/ML training data using algorithms such as Reweighing and Disparate impact remover.
    b. In-processing fairness—To detect bias in the AI/ML model generation using algorithms such as Prejudice Remover and Adversarial debiasing.
    c. Post-processing fairness—To detect bias in the AI/ML model decisions using algorithms such as Odds-equalizing and Reject option classification.

Quantification of Fairness—There are several metrics that measure individual and group fairness. For example, Statistical Parity Difference, Average Odds Difference, Disparate Impact and Theil Index.

2. Explainability: Explainability of an AI/ML model refers to unveiling of the black box model which just makes the prediction or gives the recommendation to the White box which actually gives the details of the underlying mechanism and pattern identified by the model for a particular dataset. There are multiple reasons why it is necessary to understand the underlying mechanism of an AI/ML model such as human readability, justifiability, interpretability and bias mitigation. There are three broad approaches to design an ML model to be explainable:
  a. Pre-modelling explainability—To understand or describe data used to develop AI/ML models. For example, using algorithms such as ProtoDash and Disentangled Inferred Prior VAE.
  b. Explainable modelling/interpretable modelling—To develop more explainable AI/ML models, e.g., ML models with joint prediction and explanation or surrogate explainable models. For example, using algorithms such as Generalized Linear Rule Models and Teaching Explainable Decisions (TED).
  c. Post-modelling explainability—To extract explanations from pre-developed AI/ML models. For example, using algorithms such as ProtoDash, Contrastive Explanations Method, Profweight, LIME and SHAP.

Furthermore, explanations can be local (i.e., explaining a single instance/prediction or global (i.e., explaining the global AI/ML model structure/predictions, e.g., based on combining many local explanations of each prediction).

Quantification of Explainability—Although it is ultimately the consumer who determines the quality of an explanation, the research community has proposed quantitative metrics as proxies for explainability. There are several metrics that measure explainability such as Faithfulness and Monotonicity.

3. Robustness (adversarial): There are four adversarial threats that any AI/ML model developers/scientists need to consider defending and evaluating their AI/ML models and applications.
  a. Evasion: Evasion attacks involves carefully perturbing the input samples at test time to have them misclassified. For example, using techniques such as Shadow attack and Threshold attack.
  b. Poisoning: Poisoning is adversarial contamination of training data. Machine learning systems can be re-trained using data collected during operations. An attacker may poison this data by injecting malicious samples during operation that subsequently disrupt retraining. For example, using techniques such as Backdoor attack and Adversarial backdoor embedding.
  c. Extraction: Extraction attacks aim at duplicating a machine learning model through query access to a target model. For example, using techniques such as KnockoffNets and Functionally equivalent extraction.
  d. Inference: Inference attacks determine if a sample of data was used in the training dataset of an AI/ML model. For example, using techniques such as Membership inference black-box and attribute inference black-box.

There are a number of approaches to defend AI/ML models against such adversarial attacks at each stage of the AI/ML design:
  a. Preprocessor—For example, using techniques such as InverseGAN and DefenseGAN.
  b. Postprocessor—For example, using techniques such as Reverse sigmoid and Rounding.
  c. Trainer—For example, using techniques such as General adversarial training and Madry's protocol.
  d. Transformer—For example, using techniques such as Defensive distillation and Neural cleanse.
  e. Detector—For example, using techniques such as Detection based on activations analysis and Detection based on spectral signatures.

Quantification of Robustness: There are several metrics that measure robustness of ML models such as Empirical Robustness and Loss Sensitivity.

In telecommunication networks, there had been earlier efforts to bring trust into autonomic technologies. One such initiative was by the European Union FP7/ICT sponsored project named UniverSelf which was active from 2010 to 2013 [13]. One of the objectives of the project was to propose a trust framework to bring a common understanding across Europe on the definition of labelling or certification techniques for autonomous empowered products. In Work Package 2—Deliverable 2.4 Release 3, named 'Unified Management Framework (UMF) Specifications', on page 71, the authors introduce the concept of Trust evaluation and Certification. In their work, they propose a mechanism to enable the network operators to trust in autonomic networking by verifying the reliability and performance of autonomic control loop decisions. They present a Case Based Reasoning approach that intends to attribute a trust index to the autonomic component by comparing the performance of its decisions with others in the same environment context. They also define offline and online trust indexes for the autonomic instances. Online trust means that the operation of the autonomic element is assessed at runtime after deployment at production level, while offline trust index refers to an evaluation made prior to the deployment at production level and therefore in a context different to the one in production.

There is also quite a lot of effort in fields such as health [14] and fintech [15] in developing TAI framework based on EU guidelines.

REFERENCES

[1] Docker Container, https://www.docker.com/resources/what-container.
[2] Kubeflow, https://www.kubeflow.org/.
[3] Ethical Guidelines for Trustworthy AI, https://ec.europa.eu/digital-single-market/en/news/ethics-guidelines-trustworthy-ai, European Commission.
[4] Overview of trustworthiness in artificial intelligence, https://www.iso.org/standard/77608.html, ISO/IEC.
[5] AI Fairness 360, https://aif360.mybluemix.net/, IBM.
[6] AI Explainability 360, https://aix360.mybluemix.net/, IBM.
[7] AI Adversarial Robustness 360, https://github.com/Trusted-AI/adversarial-robustness-toolbox, IBM.
[8] Explainable AI, https://cloud.google.com/explainable-ai, Google Cloud.
[9] Responsible AI, https://www.tensorflow.org/responsible_ai, TensorFlow.
[10] Oana-Maria Camburu, Explaining Deep Neural Networks, University of Oxford, 2020
[11] European Commission, Excellence and Trust in AI—Brochure|Shaping Europe's digital future (europa.eu), 2021.
[12] Maschine—erklare dich, https://www.sueddeutsche.de/wissen/ki-machinelles-lernen-neuronale-netze-informatik-erklaerbarkeit-1.5109715.
[13] UniverSelf (http://www.univerself-project.eu/), FP7 Project Contract Number 257513.
[14] Baeroe, Kristine, Ainar Miyata-Sturm, and Edmund Henden. "How to achieve trustworthy artificial intelligence for health." Bulletin of the World Health Organization 98, no. 4 (2020): 257.

[15] European Banking Federation, 'AI in the banking industry', Position paper, 2019.

SUMMARY

It is an object of the present invention to improve the prior art.

According to a first aspect of the invention, there is provided an apparatus comprising: one or more processors, and memory storing instructions that, when executed by the one or more processors, cause the apparatus to perform: receiving an intent of a service; translating the intent into a trust level requirement for an artificial intelligence pipeline related to the service; providing the trust level requirement to a artificial intelligence trust engine related to the artificial intelligence pipeline.

According to a second aspect of the invention, there is provided an apparatus comprising: one or more processors, and memory storing instructions that, when executed by the one or more processors, cause the apparatus to perform: receiving a trust level requirement for a service; translating the trust level requirement into a requirement for at least one of a fairness, an explainability, and a robustness of a calculation performed by an artificial intelligence pipeline related to the service; providing the requirement for the at least one of the fairness, the explainability, and the robustness to a trust manager of the artificial intelligence pipeline.

According to a third aspect of the invention, there is provided an apparatus comprising: one or more processors, and memory storing instructions that, when executed by the one or more processors, cause the apparatus to perform: receiving, from a trust engine, a requirement for at least one of a fairness, an explainability, and a robustness of a calculation performed by an artificial intelligence pipeline related to a service; mapping the received requirement for the at least one of the fairness, the explainability, and the robustness on at least one of a specific requirement for a data source manager of the artificial intelligence pipeline related to the service, a specific requirement for a training manager of the artificial intelligence pipeline related to the service, and a specific requirement for an inference manager of the artificial intelligence pipeline related to the service; providing the specific requirement for the data source manager to the data source manager and obtaining an actual value of the at least one of the fairness, the explainability, and the robustness from the data source manager if the received requirement is mapped to the specific requirement for the data source manager; providing the specific requirement for the training manager to the training manager and obtaining an actual value of the at least one of the fairness, the explainability, and the robustness from the training manager if the received requirement is mapped to the specific requirement for the training manager; providing the specific requirement for the inference manager to the inference manager and obtaining an actual value of the at least one of the fairness, the explainability, and the robustness from the inference manager if the received requirement is mapped to the specific requirement for the inference manager; comparing at least one of the received actual values with the corresponding requirement; issuing an error notice if the at least one of the actual values does not fulfill the corresponding requirement.

According to a fourth aspect of the invention, there is provided a method comprising: receiving an intent of a service; translating the intent into a trust level requirement for an artificial intelligence pipeline related to the service; providing the trust level requirement to a artificial intelligence trust engine related to the artificial intelligence pipeline.

According to a fifth aspect of the invention, there is provided a method comprising: receiving a trust level requirement for a service; translating the trust level requirement into a requirement for at least one of a fairness, an explainability, and a robustness of a calculation performed by an artificial intelligence pipeline related to the service; providing the requirement for the at least one of the fairness, the explainability, and the robustness to a trust manager of the artificial intelligence pipeline.

According to a sixth aspect of the invention, there is provided a method comprising: receiving, from a trust engine, a requirement for at least one of a fairness, an explainability, and a robustness of a calculation performed by an artificial intelligence pipeline related to a service; mapping the received requirement for the at least one of the fairness, the explainability, and the robustness on at least one of a specific requirement for a data source manager of the artificial intelligence pipeline related to the service, a specific requirement for a training manager of the artificial intelligence pipeline related to the service, and a specific requirement for an inference manager of the artificial intelligence pipeline related to the service; providing the specific requirement for the data source manager to the data source manager and obtaining an actual value of the at least one of the fairness, the explainability, and the robustness from the data source manager if the received requirement is mapped to the specific requirement for the data source manager; providing the specific requirement for the training manager to the training manager and obtaining an actual value of the at least one of the fairness, the explainability, and the robustness from the training manager if the received requirement is mapped to the specific requirement for the training manager; providing the specific requirement for the inference manager to the inference manager and obtaining an actual value of the at least one of the fairness, the explainability, and the robustness from the inference manager if the received requirement is mapped to the specific requirement for the inference manager; comparing at least one of the received actual values with the corresponding requirement; issuing an error notice if the at least one of the actual values does not fulfill the corresponding requirement.

Each of the methods of the fourth to sixth aspects may be a method of trustworthiness.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
  a framework for handling trustworthiness;
  enables proactive trustworthiness management;
  trustworthiness may be assured
  Regulatory requirements may be fulfilled, in particular with respect to audits.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 6 shows an apparatus according to an example embodiment of the invention;

FIG. 7 shows a method according to an example embodiment of the invention;

FIG. 8 shows an apparatus according to an example embodiment of the invention;

FIG. 9 shows a method according to an example embodiment of the invention;

FIG. 10 shows an apparatus according to an example embodiment of the invention;

FIG. 11 shows a method according to an example embodiment of the invention; and

FIG. 12 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

With the advent of 5G technology and their demanding network services, mobile networks are becoming increasingly complex to manage. Therefore, a high degree of automation is recommendable. Consequently, zero-touch networks, driven by data-centric ML/AI algorithms, are preferred to deliver a diverse set of network services with agility and speed. Although AI/ML brings forth many opportunities to optimize the mobile networks, they also introduce various ethical, legal, regulatory, social and technological challenges. Unlike classical network functions, the decision-making processes of AI/ML-based functions are generally not interpretable to users [10]. They may be also less predictable. Especially, with AI/ML algorithms predicting/executing critical decisions (e.g., mobility management for autonomous vehicles) in the mobile network, it is recommendable to have transparent, robust, fair and explainable AI/ML models in addition to accurate/efficient algorithms. This may even become crucial for the wider adoption of AI/ML driven zero-touch networks.

Figure 1:
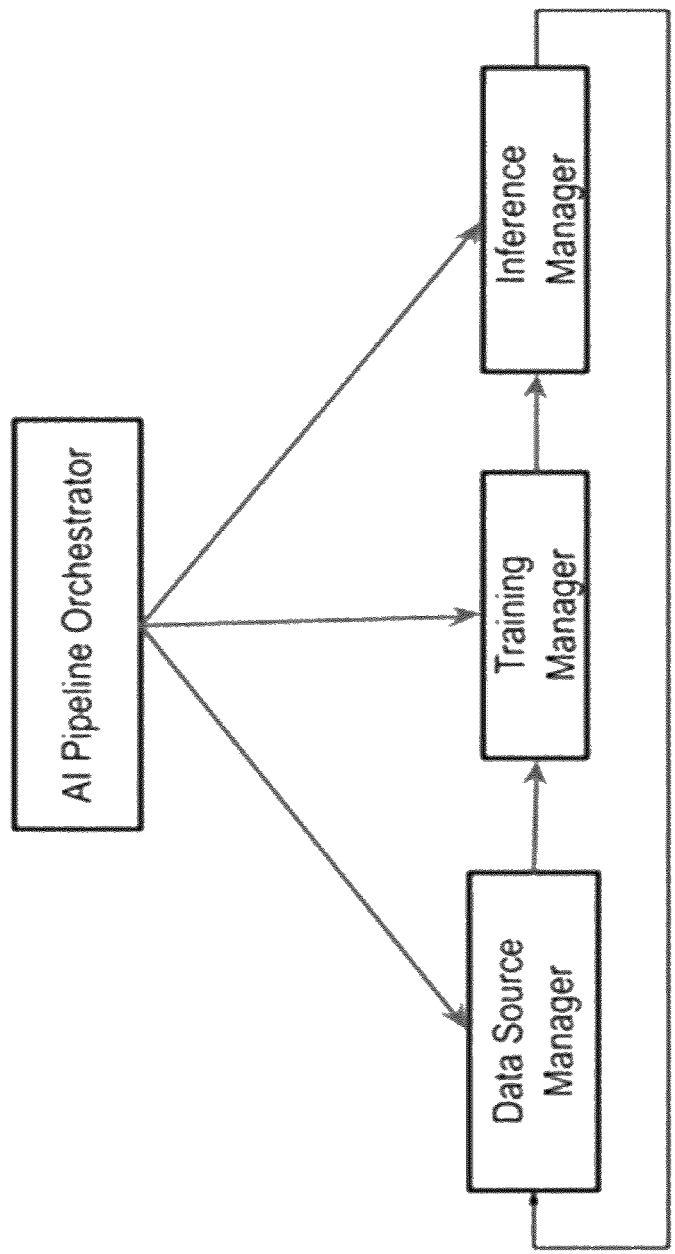
FIG. 1 shows an AI pipeline (also named ML pipeline or AI/ML pipeline)

Currently, in the telco domain, the design of AI/ML models is solely focused on improving their prediction performance (e.g., accuracy). Consequently, the AI/ML model's lifecycle management only supports AI/ML data source management, AI/ML training management, and AI/ML inference management, as shown in FIG. 1. However, there is no existing framework to incorporate trust in the AI/ML model design and deployment, and subsequently, there is no means to configure, measure or monitor the trustworthiness (e.g., fairness, robustness, explainability) of the designed/deployed AI/ML model in the telecommunication (RAN, Core, transport) domain. This may even become business-critical when mandatory regulatory requirements for AI/ML trustworthiness are introduced, which is already being initiated by the European Union [11]. Some example embodiments of the invention provide such a framework for managing and monitoring AI/ML trust(worthiness).

Trustworthiness of the AI/ML model affects several stakeholders:
  The AI/ML-driven Cognitive Network Function (CNF) vendors, who are developing the AI/ML models and provide technical support to their solutions. They would like to have very detailed explanation for the behavior of their models in a given context, e.g. to be able to troubleshoot in case of a fault or failure, or to improve the performance or the trustworthiness of their solutions.
  The network operators, who understand the context, where the CNFs are deployed, typically own the data they are trained with, in case the CNFs are trained to the local context, and configure the network (policies) and the CNFs. They should ensure the robustness and fairness of their network, and would like to understand, how the policies and reconfigurations are affecting the network behavior.
  The regulators, who are responsible for ensuring the trustworthiness of critical infrastructures, such as telecommunications. They may set rules and regulations for trustworthiness that the vendors and operators must be able to comply with.
  The end users of the network, whose Quality of Experience (QoE) may be affected by the decisions made by the CNFs. In some cases, they may have trustworthiness concerns over CNFs and e.g. require explainability. For the time being, it is assumed that this case is relatively rare.

Due to the described relevance for all of the stakeholders of an AI/ML-enabled systems in telecommunications on the one hand, and due to the increasing visibility of Trustworthiness for other domains where AI/ML is applied (even to the level of general interest media [12]), it is expected that there's a significant increase in the pressure on telco vendors like Nokia to contribute AI Trustworthiness in telco and its management. Preferably, any such solution is capable to cooperate with multi-vendors. E.g. such a solution should be preferably standardized.

The authors of the UniverSelf project introduced a means to evaluate and measure trust. However, this concept is in the context of (generic) autonomic elements and not in the context of ML lifecycle. Moreover, they attribute a trust index to the autonomic component by comparing the performance of its decisions with others in the same environment context. In contrast, some example embodiments of the invention provide a framework to configure, measure and/or monitor the trustworthiness (i.e., fairness, robustness and explainability) of the designed/deployed AI/ML model over its entire lifecycle. Such a framework may be inline with the European Union guidelines to meet TAI requirements for AI/ML models [3].

Some example embodiments of this invention provide a TAI Framework (TAIF) for Cognitive Networks (in particular: Cognitive Autonomous Networks) to facilitate the definition, configuration, monitoring and measuring of AI/ML model Trustworthiness (i.e., fairness, robustness and explainability). The TAI framework may be interoperable and suitable for multi-vendor environments. A cognitive network comprises at least one CNF. In a CAN, the CNF may autonomously meet a decision.

Figure 2:
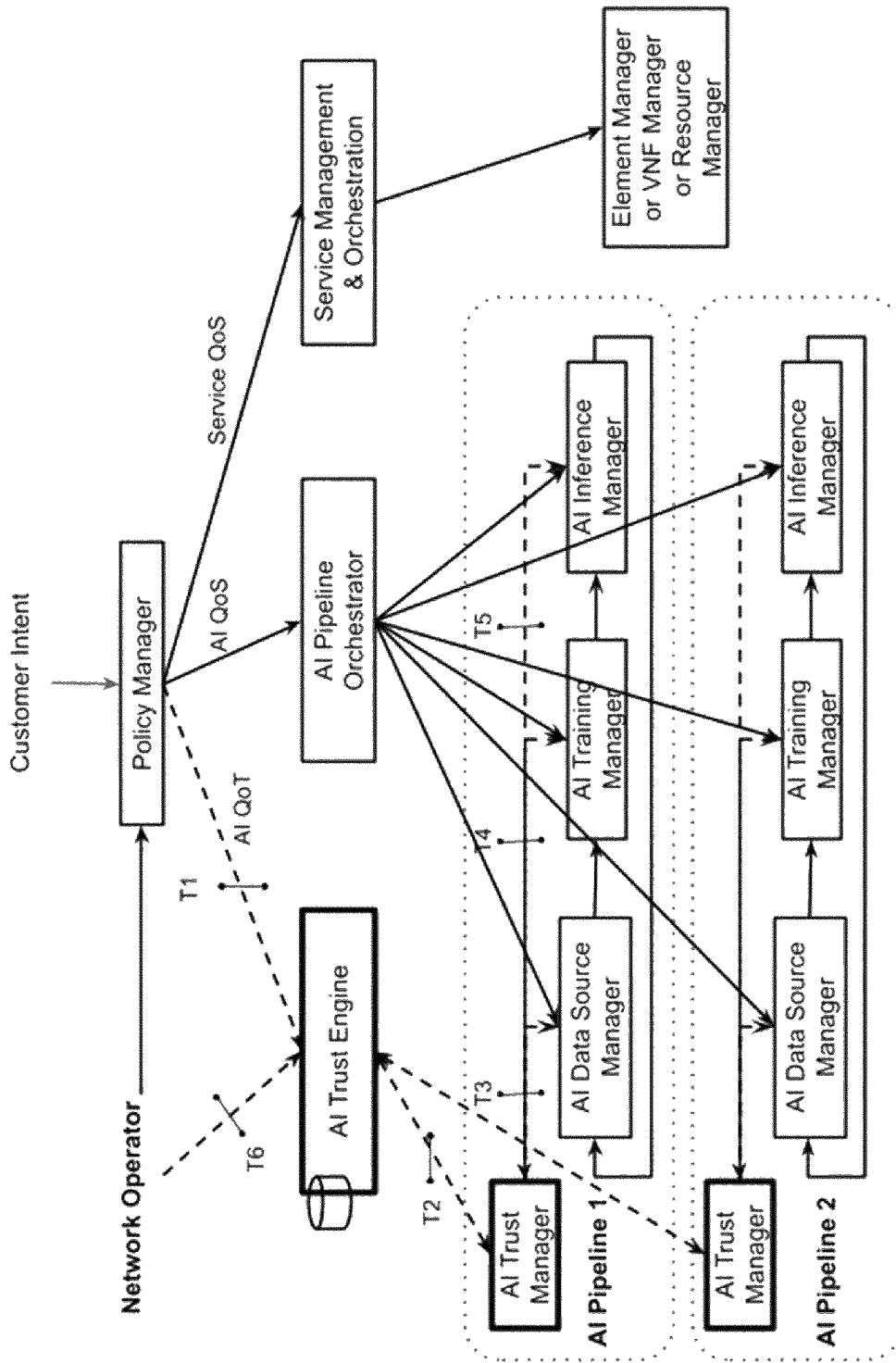
FIG. 2 shows a functional architecture off TAIF in a CAN according to some example embodiments of the invention.

A service definition or the (business) intent of the service may include AI/ML Trustworthy requirements in addition to Quality of Service (QoS) requirements, and the TAIF is used to configure the requested AI/ML Trustworthiness and to monitor and assure its fulfilment. As shown in FIG. 2, the TAIF comprises two management functions: the AI Trust Engine (one per management domain) and the AI Trust Manager (one per AI/ML Pipeline) and six new interfaces (T1-T6) that support the interactions in the TAIF. Furthermore, "AI Quality of Trustworthiness" (AI QoT) (as seen over T1 interface in FIG. 2) defines AI/ML model Trustworthiness in a unified way covering at least one of three factors, i.e., Fairness, Robustness and Explainability, similarly to how Quality of Service (QoS) is used for network performance. Note that the names of the interfaces T1 to T6 are examples only and do not limit the invention.

Preferably, Fairness, Robustness and Explainability are covered. Hereinafter, example embodiments are described where Trustworthiness covers Fairness, Robustness and Explainability, but other example embodiments of the invention may cover only one or two of them.

Figure 3:
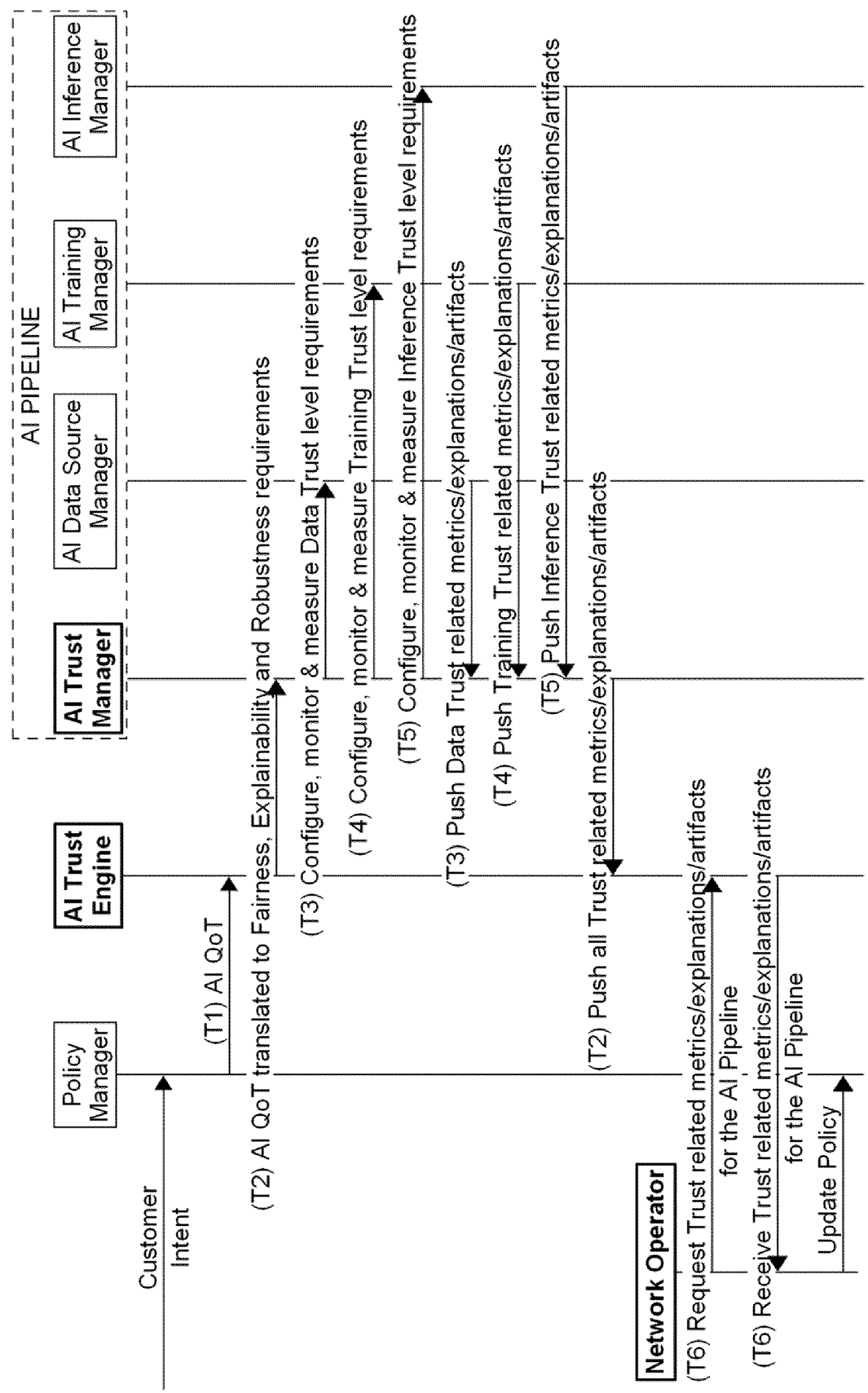
FIG. 3 shows a workflow in a TAIF according to some example embodiments of the invention.

A generic workflow in the TAIF according to some example embodiments of the invention is shown in FIG. 3. Once the Policy Manager receives the Intent from the customer (or from any other role, such as the operator, or even from another application), it is translated into AI QoT Intent/Class Identifier and sent to the AI Trust Engine over T1 interface. The AI Trust Engine translates the AI QoT Intent/Class Identifier into AI Trustworthy (i.e., Fairness, Robustness and Explainability) requirements and sends it to the AI Trust Manager of the AI Pipeline over T2 interface. The AI Trust Manager configures, monitors and measures AI Trustworthy requirements (i.e., trust mechanisms and trust metrics) for at least one of AI Data Source Manager, AI Training Manager and AI Inference Manager over T3, T4 and T5 interfaces respectively. Preferably, the AI Trust Manager configures, monitors and measures AI Trustworthy requirements for each of AI Data Source Manager, AI Training Manager and AI Inference Manager. Without limiting the invention, this is assumed for the remainder of the explanation.

The measured or collected Trustworthy metrics/artifacts/explanations from AI Data Source Manager, AI Training Manager and AI Inference Manager regarding the AI Pipeline are pushed to the AI Trust Manager over T3, T4 and T5 interfaces respectively, and/or the AI Trust Manager may retrieve the measured or collected Trustworthy metrics/artifacts/explanations from AI Data Source Manager, AI Training Manager and AI Inference Manager. The pushing and/or retrieval may be performed e.g. periodically and/or event based.

The AI Trust Manager may compare the received actual values with the corresponding requirement. If an actual value does not fulfil the corresponding requirement, the AI Trust Manager may issue an error notice. For example, the error notice may be stored in a logfile, and/or the AI Trust Manager may provide the error notice to the AI Trust Engine.

In addition to issuing the error notice, the AI Trust Manager may perform a corrective action. I.e., it may instruct at least one of the AI Data Source Manager, AI Training Manager, and AI Inference Manager to perform some activity such that future actual values will fulfil the requirement. I.e., in some example embodiments, the AI Trust Manager and at least one of the AI Data Source Manager, AI Training Manager, and AI Inference Manager form a feedback loop. Note that the corrective action may take place on the same one or another one of the AI Data Source Manager, AI Training Manager, and AI Inference Manager than that delivering the actual values not fulfilling the requirement. For example, the corrective action may be performed on one of the AI Data Source Manager, AI Training Manager, and AI Inference Manage upstream in the pipeline.

Then, the AI Trust Manager over T2 interface pushes the Trustworthy metrics/artifacts/explanations of the AI Pipeline to the AI Trust Engine which stores the information in a Trust Knowledge Database. In addition or alternatively, AI Trust engine may retrieve the Trustworthy metrics/artifacts/explanations from the AI Trust Manager. The pushing and/or retrieval may be performed e.g. periodically and/or event based. The storage time may depend on the specific needs.

Finally, the Network Operator can request and receive the Trustworthy metrics/explanations/artifacts of an AI Pipeline from the AI Trust Engine over T6 interface. Based on the information retrieved, the Network Operator may or may not decide to update the policy via Policy Manager.

Hereinafter, the functions of the AI Trust Engine, AI Trust Manager and interfaces T1 to T6 are explained at greater detail. The Functional Architecture for the TAIF in CAN according to some example embodiments of the invention is shown in FIG. 2.

AI Trust Engine (one per management domain) may comprise two main functional blocks: AI QoT Translator and Trust Knowledge Database.

AI QoT Translator of AI Trust Engine revolves around the concept of AI QoT Class Identifier. Similar to the QoS Class Identifier (QCI) that was defined in '3GPP TS 23.203, Table 6.1.7: Standardized QCI characteristics: Release 8', AI QoT Class Identifier is defined for TAI in CAN, which may comprise at least one of Fairness, Explainability and Robustness trust level requirements (typically all of them), similar to the one shown in Table 1 depicting an example. For example, for an autonomous driving service, since the risk level is very high, the trust level requirements (e.g., fairness, explainability, robustness) for an AI/ML model (e.g., proactive network-assisted lane changing) is very high. On the other hand, for a movie streaming service, since the risk level is mostly low, the trust requirements for an AI/ML model (e.g., proactive caching of video chunks from cloud to edge) is also very low. The AI QoT translator would be responsible for translating the AI QoT Class Identifier requirements into adequate Fairness, Explainability and Robustness metrics. The external behaviour of such translation function may potentially be subject to standardization. For reference, Table 1 provides some example metrics (e.g., Theil Index for Fairness, Faithfulness for Explainability, Loss Sensitivity for Robustness) based on the AI Trustworthy metrics defined in the open-source community (as discussed above).

TABLE 1

Examples of AI QoT

| AI QoT | Example Services | Fairness (Quantitative - e.g., Theil Index) | Explainability (Qualitative - e.g., explainable model & Quantitative - e.g. Faithfulness) | Robustness (Quantitative - e.g. Loss Sensitivity) |
|---|---|---|---|---|
| Class 1 | Autonomous Driving | High | Very High | Very High |
| . | . | . | . | . |
| . | . | . | . | . |
| . | . | . | . | . |
| Class N | Movie Streaming | Low | Very Low | Low |

Trust Knowledge Database of AI Trust Engine stores all trust related metrics or explanations or artifacts received from AI Trust Managers of various AI Pipelines. Preferably, these data are stored in human readable format. Typically, this database can be accessed directly by the network operator for verifying AI/ML models and to ensure ethical, transparent and secure use of AI/ML technologies in a manner consistent with network operators, end-users and government regulators.

As may be seen from the above example, in some example embodiments the trust level requirements depend not only on the Intent but also on the risk level of a service. The risk level indicates a risk caused by a failure of the service.

In some example embodiments, AI Trust Engine identifies the relevant AI Trust Manager based on a relationship between service and AI Trust Manager stored in the AI Trust Engine. In some example embodiments, AI Trust Engine discovers the relevant AI Trust Manager by a discovery request comprising an identity of the service as a parameter.

AI Trust Manager (one per AI/ML Pipeline) is proprietary for each AI/ML pipeline responsible for mapping the Fairness, Explainability and Robustness AI Trustworthy metrics received from the AI Trust Engine to AI Trustworthy mechanisms (e.g., in-processing fairness using Prejudice Remover algorithm, explainable modelling using TED algorithm) required to meet those metrics requirements at each stage of the AI/ML Pipeline. It then configures the AI Trustworthy mechanisms and monitors/measures the AI Trustworthy metrics for AI Data Source Manager, AI Training Manager and AI Inference Manager. It may issue an alarm message if a requirement is not fulfilled. It may form a feedback loop together with the AI Data Source Manager, AI Training Manager and AI Inference Manager. It implements a well-defined and potentially standardized API towards the AI Trust Engine.

T1 Interface is an interface between the Policy Manager and the AI Trust Engine. Currently, the Policy Manager translates the business intent into network QoS level requirements, including AI performance level requirements, and sends them to the Service MANO and the AI Pipeline Orchestrator, respectively. According to some example embodiments of the invention, the Network Operator may also include QoT level requirements in the business intent, and the Policy Manager translates the business intent additionally into AI QoT level requirements and send them to AI Trust Engine through T1 interface.

T2 Interface is an interface between the AI Trust Engine and the AI Trust Manager (of each AI Pipeline). The AI Trust Engine translates the AI QoT level requirements into adequate Fairness, Explainability and Robustness metrics/ explanations and sends them to AI Trust Manager of the respective AI Pipeline through T2 interface. This interface is also used by the AI Trust Managers to push the collected trust related metrics or explanations or artifacts of various AI Pipelines to AI Trust Engine. Also, the AI Trust Managers may forward potential alarm messages via the T2 interface to the AI Trust Engine.

T3 Interface is an interface between the AI Trust Manager and the AI Data Source Manager. The AI Trust Manager maps the Fairness, Explainability and Robustness AI Trustworthy metrics/explanations received from the AI Trust Engine to AI Trustworthy mechanisms (e.g., pre-processing fairness, pre-modelling explainability) required to meet those requirements at Data Source stage of the AI/ML Pipeline and configures them for AI Data Source Manager through T3 interface. Once configured, the AI Trust Manager monitors/measures and collects these metrics/explanations from the AI Data Source Manager through T3 interface. Additionally, if the Trust requirements cannot be met (at any stage, i.e. at the AI Data Source Manager, the AI Training Manager, and/or the AI inference manager), the AI Trust Manager can trigger the AI Data Source Manager via T3 interface to collect more/new data from the managed entity.

T4 Interface is an interface between the AI Trust Manager and the AI Training Manager. The AI Trust Manager maps the Fairness, Explainability and Robustness AI Trustworthy metrics/explanations received from the AI Trust Engine to AI Trustworthy mechanisms (e.g., in-processing fairness, explainable modelling) required to meet those requirements at Training stage of the AI/ML Pipeline and configures them for AI Training Manager through T4 interface. Once configured, the AI Trust Manager monitors/measures and collects these metrics/explanations from the AI Training Manager through T4 interface. Additionally, if the Trust requirements cannot be met (at any stage), the AI Trust Manager can trigger the AI Training Manager via T4 interface to retrain the AI/ML model.

T5 Interface is an interface between the AI Trust Manager and the AI Inference Manager. The AI Trust Manager maps the Fairness, Explainability and Robustness AI Trustworthy metrics/explanations received from the AI Trust Engine to AI Trustworthy mechanisms (e.g., post-processing fairness, post-modelling explainability) required to meet those requirements at Inference stage of the AI/ML Pipeline and configures them for AI Inference Manager through T5 interface. Once configured, the AI Trust Manager monitors/ measures and collects these metrics/explanations from the AI Inference Manager through T5 interface. Additionally, if the Trust requirements cannot be met (at any stage), the AI Trust Manager can trigger the AI Inference Manager via T5 interface to collect more/new trust and performance metrics for the AI/ML model.

T6 Interface is an interface between the stakeholders (in particular—Network Operator or Vendor) and the AI Trust Engine. Through T6 interface, a stakeholder can request from AI Trust Engine the trust information (i.e., metrics/ explanations/artifacts of data/model/decision) of an AI/ML model and get the detailed information. Preferably, the information is easily understandable by a human. Such a request might arrive to the Network Operator from a $3^{rd}$ party (in contract with the network operator) or a Regulator at any point in time (e.g., Autonomous Vehicle accident due to a wrong prediction by an AI/ML model). The stakeholder, after verifying the metrics/explanations/artifacts retrieved by the AI Trust Engine, can request to update a policy to the Policy Manager. On the other hand, the Network Operator may directly reconfigure the AI QoT requirements over the T6 Interface.

Figure 4A:
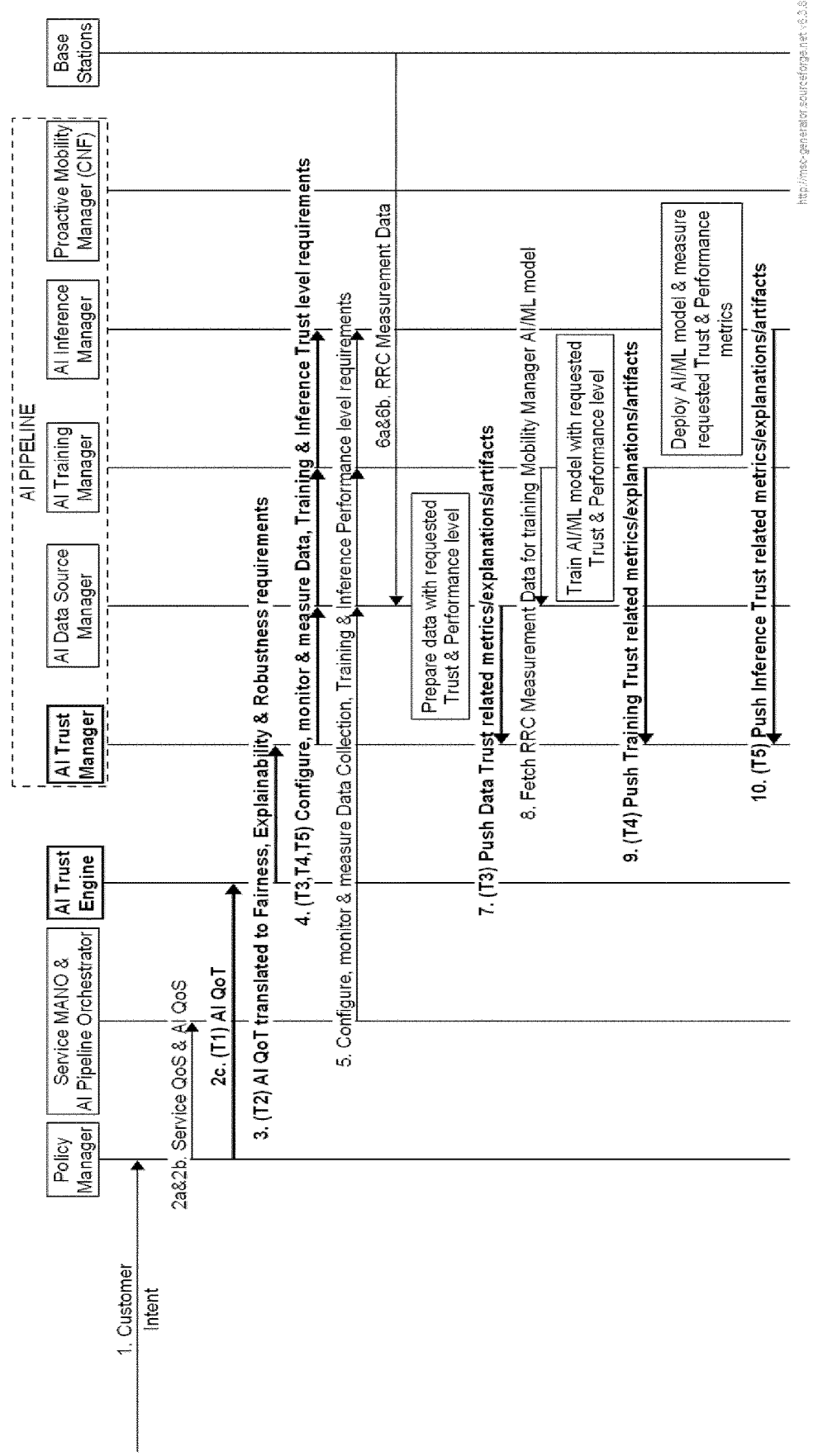
FIG. 4 shows a workflow for proactive mobility management according to some example embodiments of the invention.
Figure 4B:
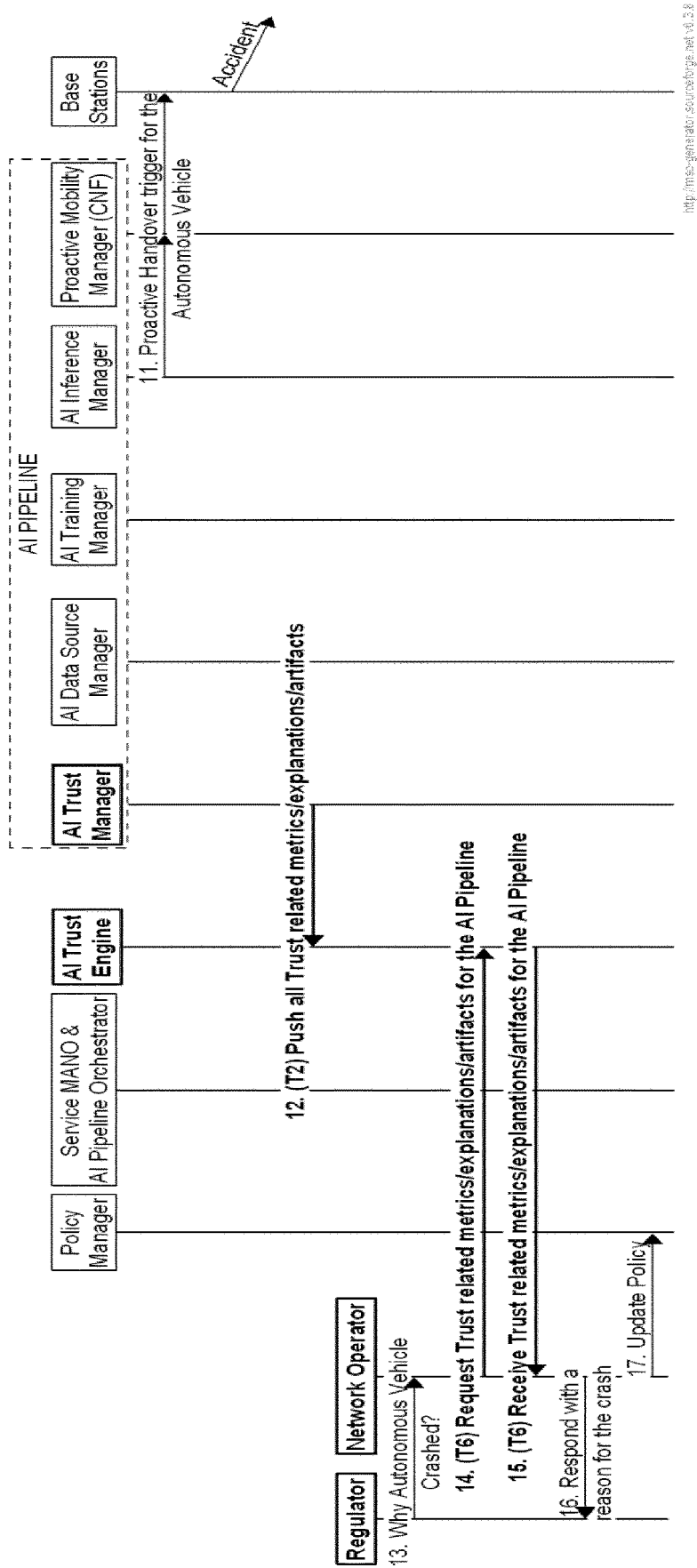

FIG. 4 (comprising FIGS. 4a and 4b) illustrates a generic TAIF implementation workflow for Trustworthy Proactive Mobility Management according to some example embodiments of the invention, based on the functional architecture represented in FIG. 2. Although a use case example of Trustworthy Proactive Mobility Management is provided, the TAIF itself is typically use case agnostic.

Action 1: Customer requests for a service via Intent request (i.e., the request for the service comprises a (business) intent).

Action 2: Policy Manager translates the Intent to service QoS, AI QoS and AI QoT Intents. Although not shown in the figure, Service MANO performs the network service onboarding process in a usual manner.

Action 3: AI Trust Engine translates the AI QoT Intent/Class Identifier into Trust level requirements comprising Fairness, Explainability, and Robustness requirements for proactive mobility management AI/ML Pipeline.

Action 4: AI Trust Manager configures, monitors and measures AI Trustworthy requirements (i.e., trust mechanisms and trust metrics) for AI Data Source Manager, AI Training Manager and AI Inference Manager, respectively.

Action 5: AI Pipeline Orchestrator configures, monitors and measures data collection/preparation, Training and Inference process via AI Data Source Manager, AI Training Manager and AI Inference Manager, respectively.

Actions 6-7: AI Data Source Manager collects RRC measurement data from base stations and then prepares the data with requested levels of Trust and Performance. It pushes the data Trust metrics/explanations/artifacts to AI Trust Manager.

Actions 8-9: AI Training Manager fetches the RRC measurement data from AI Data Source Manager and then trains the AI model with requested levels of Trust and Performance. For example, in case a neural network is being used for proactive mobility management, a surrogate explainable model might also be trained to satisfy the required explainability levels. It then pushes the model Trust metrics/explanations/artifacts to AI Trust Manager.

Action 10: Once the trained model is put into live deployment, the Inference Manager measures the requested Trust and Performance metrics. It then pushes the inference Trust metrics/explanations/artifacts to AI Trust Manager.

Action 11: Once the deployed model predicts that a handover is favorable, AI Inference Manager instructs Proactive Mobility Management CNF to trigger the handover towards the base stations. The base stations initiate the UE's (e.g., Autonomous vehicle) handover process, but for some reason the vehicle crashes.

Action 12: AI Trust Manager pushes all Trustworthy metrics/artifacts/explanations of the AI Pipeline to the AI Trust Engine.

Action 13: Regulator/vehicle company might request the reason for accident from the Network Operator.

Action 14: The Network Operator will request the AI Trust Engine to provide the Trust metrics/explanations/artifacts that will help to perform a quick root cause analysis for the accident.

Actions 15-16: The AI Trust Engine sends the Trust metrics/explanations/artifacts to the Network Operator, who then shares the root cause analysis with the Regulator/vehicle company.

Action 17: The Network Operator may update the policy via Policy Manager.

A class identifier, such as the AI QoT class identifier has one of a limited number of predefined values. Each of the predefined values (or at least most of the predefined values) defines respective plural actual/measured/estimated values. For example, a class identifier may have one of 4, 8, 16, 32, or 64 predefined values (2, 3, 4, 5, or 6 bits) or a subset of these potential predefined values, while the actual/measured/estimated values are expressed either analogue or by at least 8 bits (256 values).

Next, an alternative presentation of the TAIF implantation according to some example embodiments of the invention based on ETSI ZSM is provided.

ETSI ZSM 002 specification named 'Zero-touch network and Service Management (ZSM); Reference Architecture' groups domain management services into five categories: (i) Domain Data Collection services (ii) Domain Analytics services, (iii) Domain Intelligence services, (iv) Domain Control services, and (v) Domain Orchestration services. In addition to these five categories, some example embodiments of the invention provide another category of domain management services called e.g. 'Domain Trust' services. This category is responsible for offering management services of AI Trust Engine (i.e., AI QoT translation to Explainability, Fairness and Robustness requirements and AI trust knowledgebase for supporting regulatory requirements by storing the metrics/explanations/artifacts). Additionally, a management service is added to the Domain Intelligence services called 'AI Trust Management service' which is responsible for offering management services of AI Trust Manager (i.e., configuring, monitoring and measuring trust requirements in the entire AI/ML pipeline).

Figure 5:
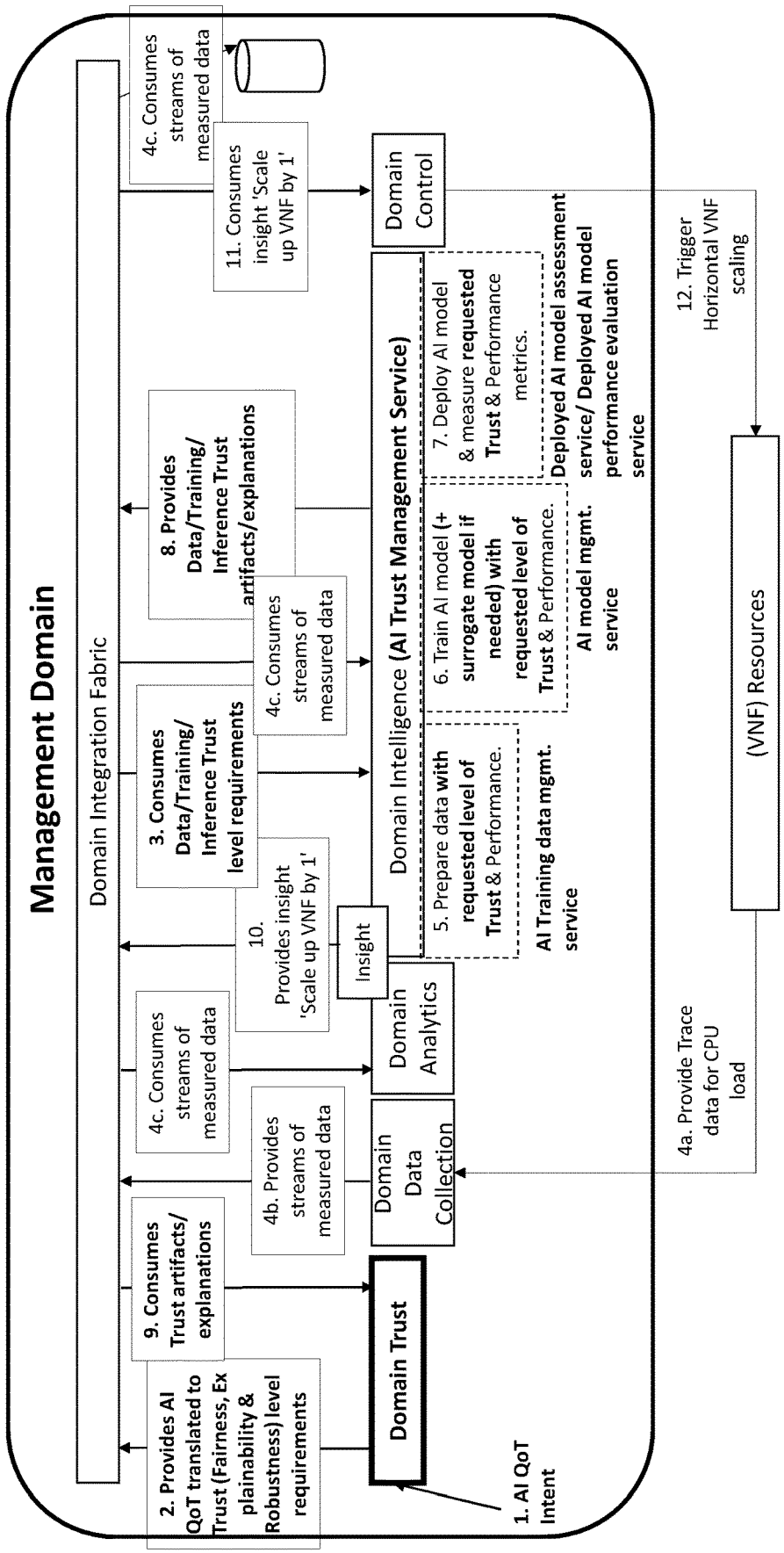
FIG. 5 shows an TAIF enhancement of an ETSI ZSM implementation including a workflow for trustworthy proactive VNF auto-scaling according to some example embodiments of the invention.

In FIG. 5, the ETSI ZSM TAIF implementation workflow is adapted for Trustworthy Proactive VNF Auto-scaling according to some example embodiments of the invention. Although a use case example of Trustworthy Proactive VNF Auto-scaling is provided, the TAIF itself is typically use case agnostic.

Action 1: Customer requests a network service via an Intent request. The Intent is translated to service QoS and AI QoT Intents. Although not shown in the figure, Domain Control/Orchestration management function performs the network service onboarding process based on service QoS requirements in a usual manner.

Action 2: A management service(s) of Domain Trust translates the AI QoT Intent to Trust level requirements comprising Fairness, Explainability and Robustness requirements for a specific AI/ML use case and exposes the service.

Action 3: AI trust management service of Domain Intelligence consumes the requested Data, Training and Inference Trust level requirements and maps them into AI Trustworthy mechanisms (e.g., pre-processing fairness, pre-modelling explainability) required to meet those requirements in the AI/ML Pipeline.

Action 4a-4c: A management service of Domain Data Collection collects CPU load data from the managed network entity (e.g., Virtual Network Function) and provides streams of measured data as a service. The management services of Domain Analytics and Domain Intelligence consume the streams of measured data. The measured data may also be stored in Data Services.

Action 5: AI training data management service of Domain Intelligence configures, monitors & measures the training data with requested level of Trust and Performance.

Action 6: AI model management service of Domain Intelligence configures, monitors & measures the training of the AI/ML model (if needed, also a surrogate explainable model) with requested level of Trust and Performance.

Action 7: Deployed AI model assessment service of Domain Intelligence configures, monitors & measures the AI/ML model inference with requested Trust and Performance metrics.

Action 8: AI trust management service of Domain Intelligence provides the Data, Training and Inference Trust metrics/explanations/artifacts.

Action 9: A management service(s) of Domain Trust consumes the Data, Training and Inference Trust metrics/explanations/artifacts and stores it in the trust knowledgebase service.

Actions 10-12: The services of Domain Analytics & Domain Intelligence provides the insight (e.g., scale up the VNF by 1) based on the AI/ML model prediction while a service of Domain Control consumes the insight and triggers the VNF auto-scaling action towards the managed entity.

Action 13: ZSM framework consumers or regulators can consume the metrics/explanations/artifacts from the trust knowledgebase management service offered by Domain Trust.

FIG. 6 shows an apparatus according to an example embodiment of the invention. The apparatus may be a policy manager or an element thereof. FIG. 7 shows a method according to an example embodiment of the invention. The apparatus according to FIG. 6 may perform the method of FIG. 7 but is not limited to this method. The method of FIG. 7 may be performed by the apparatus of FIG. 6 but is not limited to being performed by this apparatus.

The apparatus comprises means for receiving 10, and at least one of means for translating 20 and means for providing 30. The means for receiving 10, means for translating 20 and means for providing 30 may be a receiving means, translating means, and providing means, respectively. The means for receiving 10, means for translating 20 and means for providing 30 may be a receiver, translator, and provider, respectively. The means for receiving 10, means for translating 20, and means for providing 30 may be a receiving processor, translating processor, and providing processor, respectively.

The means for receiving 10 receives an intent of a service (S10). The means for translating 20 translates the intent into a trust level requirement for an artificial intelligence pipeline related to the service (S20). The means for providing 30 provides the trust level requirement to a trust engine related to the artificial intelligence pipeline. Typically, the AI pipeline is related to the service because it is used in providing the service. For example, the apparatus knows from a database entry and/or from a received message comprising the intent (or being related to the message comprising the intent) that the artificial intelligence pipeline is involved in providing the service, and/or that the trust engine is related to the artificial intelligence pipeline.

FIG. 8 shows an apparatus according to an example embodiment of the invention. The apparatus may be a trust engine (such as a AI trust engine) or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for receiving 110, and at least one of means for translating 120 and means for providing 130. The means for receiving 110, means for translating 120 and means for providing 130 may be a receiving means, translating means, and providing means, respectively. The means for receiving 110, means for translating 120 and means for providing 130 may be a receiver, translator, and provider, respectively. The means for receiving 110, means for translating 120, and means for providing 130 may be a receiving processor, translating processor, and providing processor, respectively.

The means for receiving 110 receives a trust level requirement for a service (S110). The means for translating 120 translates the trust level requirement into a requirement for a fairness, and/or an explainability, and/or a robustness of a calculation performed by an artificial intelligence pipeline used in providing the service (S120). The means for providing 130 provides the requirement for the fairness, and/or the explainability, and/or the robustness to a trust manager of the artificial intelligence pipeline (S130). For example, the apparatus knows from a database entry and/or from a received message comprising the trust level requirement (or being related to the message comprising the trust level requirement) that the artificial intelligence pipeline is involved in providing the service, and/or that the trust manager is related to the artificial intelligence pipeline.

FIG. 10 shows an apparatus according to an example embodiment of the invention. The apparatus may be a trust manager (such as a AI trust manager) or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for receiving 210, means for mapping 220, means for providing 230, means for obtaining 235, means for comparing 240, and means for issuing 250. The means for receiving 210, means for mapping 220, means for providing 230, means for obtaining 235, means for comparing 240 and means for issuing 250 may be a receiving means, mapping means, providing means, obtaining means, comparing means, and issuing means, respectively. The means for receiving 210, means for mapping 220, means for providing 230, means for obtaining 235, means for comparing 240 and means for issuing 250 may be a receiver, mapper, provider, obtainer, comparator, and issuer, respectively. The means for receiving 210, means for mapping 220, means for providing 230, means for obtaining 235, means for comparing 240, and means for issuing 250 may be a receiving processor, mapping processor, providing processor, obtaining processor, comparing processor, and issuing processor, respectively.

The means for receiving 210 receives, from a trust engine, a requirement for a fairness, and/or an explainability, and/or a robustness of a calculation performed by an artificial intelligence pipeline related to a service (S210). For example, the apparatus knows from a database entry and/or from a received message comprising the requirement (or being related to the message comprising the requirement) that the artificial intelligence pipeline is related to the service because it is involved in providing the service.

The means for mapping 220 maps the received requirement for the fairness, and/or the explainability, and/or the robustness on a specific requirement for a data source manager, and/or a training manager, and/or an inference manager of the artificial intelligence pipeline (S220). The specific requirement is for providing the service. For example, the apparatus knows from a database entry that the artificial intelligence pipeline comprises the data source manager, and/or a training manager, and/or an inference manager, respectively.

The means for providing 230 provides the specific requirement for the data source manager and/or the training manager, and/or the inference manager to the data source manager and/or the training manager and/or the inference manager, respective (S230).

The means for obtaining 235 obtains an actual value of the at least one of the fairness, the explainability, and the robustness from the data source manager, and/or the training manager, and/or the inference manager, respectively (S235). In some example embodiments, the means for obtaining 235 obtains the actual value from one of the data source manager and/or the training manager, and/or the inference manager only if the received requirement is mapped to the specific requirement for the respective one of the data source manager and/or the training manager, and/or the inference manager.

The means for comparing 240 compares at least one of the received actual values with the corresponding requirement (S240). If the at least one of the actual values does not fulfill the corresponding requirement (S240=no), the means for issuing 250 issues an error notice (S250), such as an alarm. For example, the error notice may be stored in a logfile of the AI Trust Manager, or the AI Trust Manager may forward the error notice to the AI Trust Engine. FIG. 12 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least the method according to at least one of FIGS. 7, 9, and 11 and related description.

Some example embodiments are explained with respect to a 5G network. However, the invention is not limited to 5G. It may be used in other networks, too, e.g. in previous of forthcoming generations of 3GPP networks such as 4G, 6G, or 7G, etc. The invention is not even limited to mobile communication networks but may be applied anywhere where trustworthiness of AI used in providing a service is considered. For example, it may be applied to non-3GPP mobile communication networks, wired communication networks, industrial applications (such as automation), military applications (such as enemy detection) etc.

Some example embodiments of the invention may be applied to cognitive autonomous networks. However, the invention is not limited to cognitive autonomous networks. It may be applied to other networks, too. For example, the networks may be cognitive only or autonomous only.

Some example embodiments of the invention are described where the artificial intelligence is based on machine learning. However, the invention is not limited to ML. It may be applied to other kinds of artificial intelligence.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a policy manager (such as a O & M system) or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a trust engine (such as a AI trust engine) or a component thereof, an apparatus embodying the same, a method for controlling and/or operating the same, and computer program(s) controlling and/or operating the same as well as mediums carrying such computer program (s) and forming computer program product(s). According to the above description, it should thus be apparent that example embodiments of the present invention provide, for example, a trust manager (such as a AI trust manager) or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The invention claimed is:

1. Apparatus comprising:
one or more processors, and
memory storing instructions that, when executed by the one or more processors, cause the apparatus to perform:
receiving an intent of a service;
translating the intent into a trust level requirement for an artificial intelligence pipeline related to the service, wherein the artificial intelligence pipeline comprises a data source manager configured for data collection, a model training manager configured for hyperparameter tuning, and a model inference manager configured for model evaluation;
providing the trust level requirement to an artificial intelligence trust engine related to the artificial intelligence pipeline.

2. The apparatus according to claim 1, wherein the instructions, when executed by the one or more processors, further cause the apparatus to perform:
translating the intent into at least one of a quality metrics of the service and a quality metrics of the artificial intelligence pipeline;

providing the quality metrics of the service to a management and orchestration function of the service if the intent is translated into the quality metrics of the service; and providing the quality metrics of the artificial intelligence pipeline to a pipeline orchestrator of the artificial intelligence pipeline if the intent is translated into the quality metrics of the artificial intelligence pipeline.

3. The apparatus according to claim 1, wherein the instructions, when executed by the one or more processors, further cause the apparatus to perform:

mapping the trust level requirement on an artificial intelligence quality of trustworthiness class identifier, wherein the artificial intelligence quality of trustworthiness class identifier has one of a limited number of predefined values, wherein the trust level requirement is provided to the artificial intelligence trust engine as the artificial intelligence quality of trustworthiness class identifier.

4. The apparatus according to claim 1, wherein the instructions, when executed by the one or more processors, further cause the apparatus to perform:

receiving an indication of a risk level of the service, wherein the risk level indicates a risk caused by a failure of the service;

the trust level requirement depends additionally on the risk level of the service.

5. Apparatus comprising:

one or more processors, and memory storing instructions that, when executed by the one or more processors, cause the apparatus to perform:

receiving a trust level requirement for a service;

translating the trust level requirement into a requirement for at least one of a fairness, an explainability, and a robustness of a calculation performed by an artificial intelligence pipeline related to the service, wherein the artificial intelligence pipeline comprises a data source manager configured for data collection, a model training manager configured for hyperparameter tuning, and a model inference manager configured for model evaluation;

providing the requirement for the at least one of the fairness, the explainability, and the robustness to a trust manager of the artificial intelligence pipeline.

6. The apparatus according to claim 5, wherein the instructions, when executed by the one or more processors, further cause the apparatus to perform:

receiving at least one of an actual fairness in providing the service, an actual explainability in providing the service, an actual robustness in providing the service, an explanation, and an artifact from the trust manager;

storing the received at least one of the actual fairness, the actual explainability, the actual robustness, the explanation, and the artifact in a database accessible to a network operator.

7. The apparatus according to claim 6, wherein the instructions, when executed by the one or more processors, further cause the apparatus to perform:

providing the received at least one of the actual fairness, the actual explainability, the actual robustness, the explanation, and the artifact to the network operator.

8. The apparatus according to claim 7, wherein the instructions, when executed by the one or more processors, further cause the apparatus to perform:

monitoring if a request is received to provide the at least one of the actual fairness, the actual explainability, and the actual robustness to the network operator;

inhibiting the providing of the at least one of the actual fairness, the actual explainability, and the actual robustness to the network operator if the request is not received.

9. The apparatus according to claim 5, wherein the instructions, when executed by the one or more processors, further cause the apparatus to perform:

mapping the translated requirement for the at least one of the fairness, the explainability, and the robustness on a quality of trustworthiness, wherein the quality of trustworthiness has one of a limited number of predefined values.

10. The apparatus according to claim 5, wherein the trust level requirement is expressed by an artificial intelligence quality of trustworthiness class identifier, wherein the artificial intelligence quality of trustworthiness class identifier has one of a limited number of predefined values.

11. The apparatus according to claim 5, wherein the instructions, when executed by the one or more processors, further cause the apparatus to perform:

discovering the trust manager related to the service based on an identification of the service.

12. Apparatus comprising:

one or more processors, and memory storing instructions that, when executed by the one or more processors, cause the apparatus to perform:

receiving, from a trust engine, a requirement for at least one of a fairness, an explainability, and a robustness of a calculation performed by an artificial intelligence pipeline related to a service, wherein the artificial intelligence pipeline comprises a data source manager configured for data collection, a model training manager configured for hyperparameter tuning, and a model inference manager configured for model evaluation;

mapping the received requirement for the at least one of the fairness, the explainability, and the robustness on at least one of a specific requirement for a data source manager of the artificial intelligence pipeline related to the service, a specific requirement for a training manager of the artificial intelligence pipeline related to the service, and a specific requirement for an inference manager of the artificial intelligence pipeline related to the service;

providing the specific requirement for the data source manager to the data source manager and obtaining an actual value of the at least one of the fairness, the explainability, and the robustness from the data source manager if the received requirement is mapped to the specific requirement for the data source manager;

providing the specific requirement for the training manager to the training manager and obtaining an actual value of the at least one of the fairness, the explainability, and the robustness from the training manager if the received requirement is mapped to the specific requirement for the training manager;

providing the specific requirement for the inference manager to the inference manager and obtaining an actual value of the at least one of the fairness, the explainability, and the robustness from the inference manager if the received requirement is mapped to the specific requirement for the inference manager;

comparing at least one of the received actual values with the corresponding requirement;

issuing an error notice if the at least one of the actual values does not fulfill the corresponding requirement.

13. The apparatus according to claim 12, wherein each of the specific requirements comprises at least one of a required algorithm, a configuration, and a measuring target.

14. The apparatus according to claim 12, wherein the instructions, when executed by the one or more processors, further cause the apparatus to perform:
providing at least one of the obtained actual values to the trust engine.

15. The apparatus according to claim 14, wherein the instructions, when executed by the one or more processors, further cause the apparatus to perform:
monitoring if a request for the at least one of the received actual values is received from the trust engine;
inhibiting the providing of the at least one of the received actual values to the trust engine if the request is not received.

16. The apparatus according to claim 12, wherein the instructions, when executed by the one or more processors, further cause the apparatus to perform:
monitoring if the error notice is issued;
instructing, if the error notice is issued, at least one of the data source manager, the training manager, and the inference manager to perform a corrective action in order to make the actual values in future to fulfill the corresponding requirement.

\* \* \* \* \*